United States Patent Office 3,267,022
Patented August 16, 1966

3,267,022
HYDROCRACKING PROCESS AND CATALYSTS
Rowland C. Hansford, Yorba Linda, Calif., assignor to Union Oil Company of California, Los Angeles, Calif., a corporation of California
No Drawing. Filed Jan. 24, 1964, Ser. No. 339,897
12 Claims. (Cl. 208—111)

This application is a continuation-in-part of application Serial No. 150,129, filed November 6, 1961, now abandoned, which in turn is a continuation-in-part of application Serial No. 72,325, filed November 29, 1960, and now abandoned.

This invention relates to methods for the catalytic hydrocracking of hydrocarbons, especially high-boiling mineral oil fractions, to produce lower boiling fractions such as gasoline or jet fuel, and is particularly directed to certain novel catalysts for use therein. The new catalysts comprise as the essential active component a zeolitic molecular sieve cracking base combined with a minor proportion of a transitional metal hydrogenating promoter. More specifically, the molecular sieve cracking base is a hydrogen, or "decationized," form of a certain class of crystalline, zeolitic alumino-silicates characterized by (1) relatively uniform crystal pore diameters of between about 6 and 14 A., preferably 9 to 10 A., and (2) a silica/alumina mole-ratio greater than 3, and preferably between about 3 and 6. The hydrogenating promoter may comprise any one or more of the transitional metals, their oxides or sulfides, and particularly the metals of Group VIB and Group VIII, and their oxides and sulfides.

The combination of the microcrystalline zeolitic cracking base with the hydrogenating promoter is further compounded and copelleted with the second essential catalyst component, viz., a relatively inert, powdered, refractory adjuvant material selected from the class consisting of alumina, magnesia, silica, hydrogen clays and mixtures of two or more of such components. The copelleted catalysts are found to display an optimum combination of mechanical stability and high activity resulting from the synergistic combination of the adjuvant and the hydrogen zeolite catalyst.

It has recently been discovered that the zeolitic molecular sieves of this invention, when converted to a hydrogen form and promoted with a Group VIII metal, constitute catalysts of extremely high intrinsic hydrocracking activity. These new catalysts are in fact from about two to ten times as active, on an equal volume basis, as the more conventional hydrocracking catalysts based on amorphous silica-alumina cogels. This improved activity is believed to arise from the much higher concentration of active acidic cracking centers associated with the crystalline hydrogen zeolites, as compared to the amorphous catalysts.

The zeolite catalysts however suffer from the disadvantages of higher manufacturing costs, and also the greater difficulty involved in preparing pellets of suitable mechanical strength and stability. It has now been discovered, most unexpectedly, that the effective cost of the zeolite catalysts (both on a flat cost-per-pound basis, and on the basis of total cost of a catalyst charge required to effect a given conversion at a given feed throughput rate) can be materially reduced by simply diluting the powdered zeolite catalyst with substantial amounts of the specified, relatively inexpensive adjuvant materials, and copelleting the mixture. The surprising aspect of this discovery is that, on an equal bulk volume basis, the diluted and copelleted catalysts display a hydrocracking activity which is at least equal, and in most cases higher than, the activity of the undiluted zeolite catalyst in the form of isometric pellets having a bulk density of 0.7 gram/ml. or higher. At the same time, the additional benefit is obtained that, under proper conditions, the adjuvant functions also as an effective binder, giving pellets of materially improved mechanical stability.

The term "bulk volume activity," as employed herein, is numerically equal to the liquid hourly space velocity required to effect a given conversion at a given feed throughput rate, and under a given set of process conditions. It is thus inversely proportional to the bulk volume of catalyst which is required to effect such a conversion. Those skilled in the art will readily appreciate that an important consideration in hydrocarbon conversion processes is to effect the desired conversion at as high a space velocity as possible, for this reduces reactor size and catalyst inventory to a minimum. Reactor size is an extremely important economic consideration in high-pressure conversion processes such as hydrocracking because of the fabrication and material costs of the required heavy-walled reactors. For this reason it is generally considered impractical to dilute or otherwise attenuate the active catalyst within the reactor, for this normally results simply in larger reactors. It thence came as a distinct surprise to find that the unique catalysts of this invention could be substantially diluted with the specified adjuvants without the normally ensuing consequences of larger catalyst volumes and reactors to achieve the same feed throughput and conversion.

The theoretical explanation for the observed results obtained herein is not entirely clear. It would appear however that the pure zeolite catalyst, being composed of crystals of about 1 to 5 microns in size, tends to form close-packed structures when compacted into larger granules or pellets. The result is that the exterior surface of the granules presents a relatively impervious barrier to the diffusion of gases, resulting in inefficient utilization of the highly concentrated active centers located in the interior of the pellets. This problem is not generally encountered in the pelleting of conventional amorphous catalysts, or even of other known zeolite catalysts; it appears to be uniquely associated with the hydrogen zeolites of this invention, and is attributable to the three interrelated factors of (1) a crystal form which permits close packing upon compaction, (2) small crystal pores which in themselves provide insufficient access to the core of the pellets, and (3) the unusually large number of active centers per weight unit of the zeolite.

Depending upon the pressure employed in pelleting the undiluted hydrogen zeolite catalysts of this invention, pellets varying in bulk density from about 0.55 to 0.75 gm./ml. can be produced. All of the pelleted catalysts in this bulk density range are found to be "diffusion limited" to some extent, at least in the case of pellets larger than about 1/16" in diameter. In the lower bulk density ranges, relatively more of the intercrystalline channels remain open, thus minimizing the problem, but in these cases the mechanical strength of the pellets is so low as to render them of no practical use. In the higher density ranges, from about 0.65 to 0.75, the pellet strength is superior (though still deficient), but in these cases the diffusion limitation problems are most pronounced.

The bulk density figure of 0.7 gm./ml. is taken for purposes of this invention as a reference standard for the pure pelleted zeolite catalysts, representing minimally adequate mechanical stability for commercial utility. Against this reference standard, it has been found that by diluting the zeolite component with the adjuvant materials of this invention, composite catalyst pellets of the same size may be prepared which display equal or superior hardness, and equal or superior activty, on an equal bulk volume basis. This means that, as measured against a pure pelleted hydrogen zeolite catalyst of 0.7 bulk density (or higher), the catalysts of this invention can be utilized at the same or higher liquid hourly space velocity to achieve the same conversion and feed throughput under the same process conditions, as can be achieved with the pure zeolite catalyst. In other words, one volume of the diluted catalysts of this invention will do the work, and usually more than the work, of an equal volume of isometric pellets of the undiluted catalyst of 0.7 bulk density. And this notwithstanding the fact that the bulk density of the diluted catalysts is normally higher than 0.7, in the range of about 0.7 to 0.9 gm./ml.

To take advantage of the superior available activity in the diluted catalysts of this invention, it is contemplated to use these catalysts at higher liquid hourly space velocities than would be required under the same conditions, and at the same feed throughput and conversion conditions, to obtain the same conversion with undiluted zeolite catalyts of 0.7 bulk density. Alternatively, it may be desirable in some cases to utilize the superior activity to obtain a conversion temperature advantage. In this case, the diluted catalyst would be employed at lower hydrocracking temperatures than would be required to obtain the same conversion at the same space velocity with the undiluted catalyst of bulk density 0.7. The space velocity advantage is utilized where capital investment in reactors and catalyst inventory is the primary consideration, and the temperature advantage is normally utilized where long run lengths and superior product distribution are the primary desired objectives. (Long run lengths normally are best achieved by starting a hydrocracking run at a low temperature and gradually increasing the temperature until some terminal temperature is reached at which the product distribution becomes undesirable.)

The intrinsic activity of the catalysts of this invention is derived principally from the silica-rich, zeolite molecular sieve cracking bases in their "decationized," or hydrogen form. These crystalline zeolites are composed mainly of silica and alumina, the $SiO_2/Al_2O_3$ mole-ratio being at least 3, and preferably between about 3 and 6. They display relatively uniform crystal pore diameters between about 6 and 14 A, usually 9–10 A. They are to be distinguished from the "X" type molecular sieve zeolites (described for example in U.S. Patent No. 2,882,244), in that the X zeolites have a $SiO_2/Al_2O_3$ ratio of only about 2.5 and cannot be appreciably decationized without destroying their crystal structure.

Suitable synthetic zeolites for use herein are more particularly described in Belgian Patent No. 598,582, issued April 14, 1961. The preferred zeolite is designated as the "Y" crystal type in said patent, but the "L" crystal type described therein is also contemplated. Natural zeolites such as faujasite, erionite, mordenite and chabazite may also be employed.

In general, the Y zeolite in its sodium form can be prepared by first aging an aqueous sodium alumino-silicate mixture at relatively low temperatures of e.g., 10–40° C., and then heating the mixture at temperatures between about 40° and 125° C. until crystals are formed, and separating the crystals from the mother liquor. When a collodial silica sol is employed as the source of silica, the aqueous sodium alumino-cilicate mixture may have a composition as follows, expressed in terms of mole-ratios:

$Na_2O/SiO_2$ _____ 0.2–0.8
$SiO_2/Al_2O_3$ _____ 10–30
$H_2O/Na_2O$ _____ 25–60

When sodium silicate is used as the silica source, the optimum molar proportions are as follows:

$Na_2O/SiO_2$ _____ 0.6–2.0
$SiO_2/Al_2O_3$ _____ 10–30
$H_2O/Na_2O$ _____ 30–90

The resulting Y zeolites correspond to the general formula:

$$0.9 \pm 0.2 Na_2O : Al_2O_3 : nSiO_2 : xH_2O$$

where $n$ is a number from 3 to about 6 and $x$ is any number up to about 10.

The "decationized," or hydrogen form of the Y zeolite may be prepared by ion-exchanging the alkali metal cations with ammonium ions, or other easily decomposable cations such as methyl substituted quaternary ammonium ions, and then heating to, e.g., 300°–400° C., to drive off ammonia, as is more particularly described in Belgian Patent No. 598,683. The degree of decationization, or hydrogen exchange, should be at least about 20%, and preferably at least about 40% of the maximum theoretically possible.

Originally, it was thought that a truly "decationized," (i.e., cation-deficient) zeolite was formed upon heating the ammonium zeolite, but the evidence presently available indicates that at least a substantial proportion of zealitic hydrogen ions remain associated with the ion-exchange sites, and that little or no true "decationization" takes place. It will be understood however, that the term "hydrogen zeolite" as used herein is intended to designate the type of zeolite produced by thermal decomposition of the ammonium zeolite, irrespective of whether some degree of true "decationization" may take place.

Mixed, hydrogen-polyvalent metal forms of the Y zeolite are also contemplated. Generally such mixed forms are prepared by subjecting the ammonium zeolite to a partial back-exchange with divalent metal salt solutions. The resulting divalent metal-ammonium zeolite may then be heated at, e.g., 400–900° F. to prepare the divalent metal-hydrogen form. Here again, it is preferred that least about 20% of the monovalent metal cations be replaced with hydrogen ions. It is further preferred that at least about 10% of the monovalent metal cations be replaced by divalent metal ions, e.g., magnesium, calcium, zinc or the like, for this is found to improve the hydrolytic stability of the resulting catalysts. A still further preference to be observed for maximum activity is that not more than about 20% of the original monovalent metal cations (3% by weight of $Na_2O$) shall remain in the catalyst.

Hydrogenation activity is imparted to the zeolitic cracking base by adding a minor proportion, e.g., 0.05–20%, of one or more of the Group VIB and/or Group VIII metals, preferably a Group VIII noble metal. Specifically, it is preferred to employ about 0.1% to 3% by weight of palladium, platinum, rhodium, ruthenium or iridium. These Group VIII metals may be added by impregnation of the calcined hydrogen zeolite, but preferably they are added by ion-exchange during, or directly after the ammonium ion-exchange step, i.e., before the ammonium zeolite is decomposed to form the hydrogen zeolite.

To incorporate the Group VIII metals by ion exchange, the ammonium zeolite, still in a hydrous form, is digested with an aqueous solution of a suitable compound of the desired metal wherein the metal is present in a cationic form. Preferably, fairly dilute solutions of the Group VIII metal salts are employed, and it can be assumed that there will be a substantially quantitative exchange of ammonium ion for the Group VIII metal. The exchanged metal-ammonium zeolite is then filtered off, washed and dried to about 5–20% water content. The resulting partially hydrated metal-ammonium zeolite powders are then normally copelleted with the desired adjuvant material. Alternatively, the ammonium zeolite may be copelleted with the adjuvant prior to the addition of hydrogenating metal, and the latter may then be added to the copelleted composite, so as to impregnate both the zeolite and the adjuvant. In either case, the final calcining to prepare the hydroegn zeolite is normally performed after the pelleting operation.

The refractory adjuvants selected for use herein, namely alumina, magnesia, silica, hydrogen clays, or mixtures thereof, appear to possess an ideal combination of chemical and physical properties for the required use.

Their average pore diameter is generally between about 50 and 150 A. (these pore sizes referring to pores in the individual particles, and not the interparticle pores). Pores of this size are sufficiently large that substantially no diffusion limitations will appear in pellets of the normal size, i.e., between about 1/16 and 3/8-inch, over the normal pelleting pressure ranges. Thus, the mixture of zeolite catalyst and adjuvant can be pelleted under pressures sufficient to achieve substantially any desired hardness without encountering the diffusion limitations which occur upon pressure-pelleting of the zeolite component alone. Further, these adjuvants possess desirable binding properties when hydrated to the extent of, e.g., 20–50 weight-percent water, so that the deficiencies in mechanical stability of the pure zeolite pellets are substantially overcome without resorting to high-pressure pelleting. Some of the adjuvants, particularly the clay materials, are capable of forming wet plastic mixes suitable for the formation of extruded catalysts. Finally, none of these selected adjuvants are found to exert any deleterious chemical interaction with the acidic zeolite component, such as to impair the intrinsic activity thereof. It is believed in fact that at least some of these materials may exert a desirable synergistic reaction with the zeolite base so as to create additional active centers.

Suitable clay adjuvants for use herein include both the montmorillonite types and the kaolin types, when converted to a hydrogen form substantially free of zeolitic alkaline metals. The hydrogen forms can be prepared either by conventional acid-washing (which also removes some of the alumina), or by ion exchanging an aqueous suspension of the clay with an acid exchange resin such as Amberlite IR–120. The latter procedure produces a hydrogen clay with its natural silica-alumina framework substantially intact.

Silicas for use herein include for example silica gel, and various naturally occurring forms of silica such as diatomaceous earth, kieselguhr, and the like. In using the naturally occurring silicas, it is normally preferable to remove contaminating metals and alkalis by acid-washing. Other amorphous forms of silica may also be employed.

Suitable aluminas for use herein include alumina gel, alumina trihydrate, activated alumina, bauxite, alpha alumina, and the like. In using precipitated alumina gel, or gamma alumina, it is normally preferable to admix therewith a small proportion of silica gel to stabilize the alumina. Synthetic silica-alumina cracking catalysts may also be employed, which contain up to about 90% silica.

The magnesia adjuvants are normally prepared by precipitating magnesium hydroxide from an aqueous solution of a magnesium salt, followed by draining and drying. Any other form of amorphous or microcrystalline magnesia may be employed however.

In one modification of the invention, the powdered adjuvant material may be modified by the incorporation therein of a hydrogenating promoter, which may be the same as or different from the hydrogenating promoter used on the zeolitic component. This modification is particularly desirable in connection with the treatment of high-end-point, nitrogen-containing feedstocks boiling above about 650° F. and up to about 1,000° F. The heavy polycyclic hydrocarbons and nitrogen compounds in the high-end-point feedstocks tend to plug the pores of the zeolite crystals, but may be effectively hydrogenated, and hydrocracked if desired, by contact with the active surface area of the adjuvant when modified by the incorporation of a hydrogenating promoter. This is feasible in view of the larger average pore diameter of the adjuvant material. The hydrogenating promoter is preferably added to the adjuvant before incorporation with the zeolite component.

The optimum proportion of adjuvant material to be employed in the finished catalyst will vary considerably, depending upon the particular zeolite catalyst, the specific adjuvant employed, and the particular feedstock which is to be converted. In general, it may be said that any proportion of the adjuvant will benefit the catalyst to some extent, both in mechanical strength and in efficiency of utilization of the active zeolite component. Optimum proportions generally range between about 10% and 80% by weight of the final catalyst composition, with the preferred range lying between about 20% and 50%. Normally it is desirable to employ the critical proportion of adjuvant which results in most economical utilization of the active zeolite component, considering both the cost per pound of catalyst and the reactor size required for its utilization in the desired service. This proportion will be relatively high, e.g., 40–80%, for highly active zeolite catalyst components wherein 80–100% of the ion-exchange capacity is satisfied by hydrogen ions, and the proportion will be relatively low, e.g., 10–40% by weight, when the zeolite component is relatively less active, as where only about 20–50% of the ion-exchange capacity is satisfied by hydrogen ions. In all cases however it is preferred to use at least about 15–20% by weight of adjuvant from the standpoint of obtaining adequate mechanical stability of the pellets.

The hydrocracking feedstocks which may be treated herein include in general any mineral oil fraction boiling above the conventional gasoline range, i.e., above about 300° F. and usually above about 400° F., and having an end-boiling-point of up to about 1,000° F. This includes straight-run gas oils and heavy naphthas, coker distillate gas oils and heavy naphthas, deasphalted crude oils, cycle oils derived from catalytic or thermal cracking operation and the like. These fractions may be derived from petroleum crude oil, shale oils, tar sand oils, coal hydrogenation products and the like. Specifically, it is preferred to employ feedstocks boiling between about 400° and 800° F., having an API gravity of 20 to 35°, and containing at least about 30% by volume of acid-soluble components (aromatics+olefins). Organic nitrogen contents may range between about 1 and 2,000 p.p.m., preferably between about 5 and 100 p.p.m. Sulfur compounds may also be present.

An important feature of the hydrocracking process resides in the use of temperatures considerably lower than conventional. At space velocities of about 0.7 to 8.0, it is contemplated herein to commence the hydrocracking runs at temperatures between about 450° and 600° F. to obtain 30–80% conversion to gasoline per pass, and continue to a terminal temperature of about 750° to 850° F., with at least half of the run being carried out at below about 750° F. At pressures between about 500 and 3,000 p.s.i.g., run lengths of at least about six months are entirely feasible, and usually up to about one year or more. Such runs are generally not possible with conventional hydrocracking catalysts, except by resorting to uneconomically low space velocities in the range of about 0.1 to 0.5.

In the above or other types of hydrocracking operations, it is contemplated that the catalysts may be used under the following operating conditions:

|  | Operative | Preferred |
| --- | --- | --- |
| Temperature, °F | 450–850 | 500–800 |
| Pressure, p.s.i.g | 500–3,000 | 800–2,000 |
| LHSV | 0.7–8.0 | 1.0–5.0 |
| $H_2$/oil ratio, s.c.f./b | 1,000–20,000 | 3,000–15,000 |

The selection of specific operating conditions within the above ranges will depend upon many factors, principally the nature of the feedstock. In particular, the operating temperature for a given conversion is very sensitive to nitrogen content of the feed. Feeds containing less than about 1 p.p.m. of nitrogen can be hydrocracked in the low temperature ranges. For feeds richer in nitrogen, exemplary initial temperatures for obtaining about 50% conversion of a 750° F. end-point gas oil to 400° F. end-point gasoline per pass, at 1.5 LHSV and 1,500 p.s.i.g., are as follows:

| Feed nitrogen content, p.p.m.: | Initial hydrocracking temp. ° F. |
|---|---|
| 1–10 | 520–580 |
| 10–50 | 580–680 |
| 50–2,000 | 680–720 |

An important feature to observe at this point is that, although higher temperatures are required for nitrogen-containing feeds, these temperatures are relatively stable, and the desired conversion can be maintained with very gradual temperature increases of, e.g., 0.01–2° F. per day until the 850° F. terminal temperature is reached. This is in sharp distinction to the temperature-increase requirements for conventional, amorphous silica-alumina hydrocracking catalysts; with these conventional catalysts, employed under the same conditions, steep, progressive temperature increases are required, even with feeds containing as little as 1 p.p.m. of nitrogen. A typical such operation using a 5 p.p.m.-nitrogen feed may require temperature increases of 5–10° F. per day to maintain constant conversion, resulting in a run length of only about 1–2 months or less.

The following examples are cited to illustrate the techniques and results obtainable by the process of this invention, but not to be construed as limiting in scope:

*Example I*

A Pd-hydrogen Y-molecular sieve catalyst was prepared by first converting a sodium Y-molecular sieve ($SiO_2/Al_2O_3$ mole-ratio=4.9) to the ammonium form by ion-exchange (90% replacement of Na ions by $NH_4$ ions), followed by the addition of 0.5 weight-percent of Pd by ion exchange, then draining, drying and calcining at 600–900° F. The resulting catalyst, in the form of 3/16" x 1/8" pellets having a bulk density of 0.66 gm./ml., was then tested for hydrocracking activity, using as feed an unconverted cycle oil derived from a previous hydrofining-hydrocracking run. Its characteristics were as follows:

| | |
|---|---|
| Gravity, ° API | 38.3 |
| Boiling range, Engler, ° F. | 440–562 |
| Acid-soluble components, vol. percent | 18.5 |
| Sulfur, wt. percent (added) | 0.1 |
| Nitrogen, wt. percent | 0.0007 |
| Aniline point, ° F. | 151.1 |

Prior to use in the hydrocracking test, the catalyst was reduced in hydrogen at 700° F. for 1 hour, and for 2 hours at 650° and 1,000 p.s.i.g. It was then sulfided with kerosene containing 10% sulfur (as thiophene) for 2 hours at 650° F., 1,000 p.s.i.g., 2 LHSV and with 10,000 s.c.f./b. of hydrogen. The temperature was then reduced to 600° F. and the test feed was substituted for the kerosene, the other conditions remaining the same for the hydrocracking run. Notwithstanding the high space velocity, low temperature and low pressure, the conversion to 400° F. end-point gasoline was 61.5% volume-percent of the feed. There was substantially no decline in activity over the 16 hour run, and visual inspection of the catalsyt at the end of the run showed the substantial absence of coke.

*Example II*

About 43 parts by weight of the catalyst of Example I was ground to a 300-minus mesh powder, and copelleted with 57 parts by weight of 100–325 mesh activated alumina, the final pellets being 1/8" in diameter and having a bulk density of 0.80 gm./ml. Upon testing this catalyst under the conditions of Example I (LHSV=2, based on bulk volume of finished catalyst), the conversion to 400° F. end-point gasoline was 81.4%, thus demonstrating that the use of a granular adjuvant gives even better results than the pure catalyst. It will be noted also that, on the basis of the active zeolite component, the 81.4% conversion of this example was obtained at a space velocity more than twice that of Example I, based on the active zeolite catalyst component.

*Example III*

A sample of the copelleted catalyst of Example II was reduced in hydrogen at 900° F. to remove the sulfide sulfur, and was then tested for hydrocracking the feed of Example I, minus the added sulfur, the feed then containing less than 0.005% sulfur. Under the same hydrocracking conditions, the conversion to 400° F. end-point gasoline was 97.1%, thus demonstrating that the catalyst is even more active in unsulfided form than in the sulfided form. The 97.1% conversion at 600° F., and an effective space velocity of more than 4 (based on pure zeolite catalyst), indicates an activity greater than any other known hydrocracking catalyst.

*Example IV*

An extruded catalyst composite was prepared by mixing 15 weight-percent of a powdered, ion-exchanged hydrogen montmorillonite clay with 85 weight percent of a 0.5% Pd-Y molecular sieve hydrocracking catalyst wherein about 50% of the ion-exchange capacity was satisfied by hydrogen ions, and about 40% by magnesium ions (3.6 weight-percent MgO). Sufficient water was added to form a stiff paste, and the mixture was then extruded through 1/8-inch dies, followed by drying and calcining of the extrudate. The calcined extrudate was then broken up into cylindrical pellets of about 1/8"×1/8" size (0.6 gm./ml. bulk density) and tested for hydrocracking activity, using a hydrofined coker distillate gas oil as feed at 1,000 p.s.i.g., 1.5 LHSV and 8,000 s.c.f./b. of hydrogen. After 70 hours on-stream, the temperature required to maintain the predetermined 55 volume percent conversion per pass to 400° F. end-point gasoline was about 556° F. This temperature is considerably lower than is required to maintain such a conversion level at 70 hours using 1/8" pellets of the pure zeolite component alone, pelleted to a bulk density of 0.7 gm./ml.

*Example V*

A composite of 50 weight-percent precipitated magnesia and 50 weight-percent of the Pd-hydrogen Y-sieve catalyst of Example I (ground to 300-minus mesh), was copelleted in a tableting machine to form 1/8" pellets of 0.90 gm./ml. bulk density. The resulting catalyst, after drying and calcining, was tested for hydrocracking activity, using as feed an unconverted, 750° F. end-point gas oil derived from a previous hydrofining-hydrocracking run. The test conditions were: 1,500 p.s.i.g., 1.0 LHSV, and 8,000 s.c.f./b. of hydrogen. After about 25 hours on-stream, the predetermined 43.7 volume-percent conversion per pass to 400° F. end-point gasoline was found to require a hydrocracking temperature of only about 525° F. This temperature is about 15° F. lower than was required to maintain an equivalent conversion using the same Pd-hydrogen Y-sieve catalyst copelleted to 0.81 bulk density with 50% by weight of activated alumina. Thus the magnesia-diluted catalyst is more active than the corresponding alumina-diluted catalyst, which in turn is more active than the original undiluted catalyst of Example I.

*Example VI*

This example illustrates the desirable combination of pellet strength and catalyst activity resulting from the copelleting of alumina hydrate with the partially hydrated ammonium zeolite catalyst. The initial zeolite catalyst component was a 0.5% Pd-ammonium Y-sieve zeolite which had been partially back-exchanged with magnesium (to give 3.5 weight percent MgO) and dried to a water content of about 20 weight percent. Several lots of this catalyst component were mixed with varying proportions of spray-dried alumina trihydrate containing 5 weight percent of coprecipitated silica gel. In some cases the alumina-silica gel was impregnated with 0.2–0.5% by weight of palladium. The powdered mixtures were then compressed into ⅛″ pellets, dried and calcined (to convert the ammonium zeolite to the hydrogen form) and tested for activity and mechanical stability.

Activity was measured in terms of temperature required to give 55 volume-percent conversion to 400° F. end-point gasoline after 90 hours on-stream at 1,000 p.s.i.g., 1.5 LHSV and 8,000 s.c.f./b. of hydrogen, using a gas oil feed very similar to that employed in Example V.

Pellet strength and stability was measured (before use in the activity test) by rehydrating and recalcining the pellets, then determining the average crushing strength and comparing with the original crushing strength of the pellets. In addition, determinations were made on the weight percent of pellets which were broken or shattered during the activity test runs. The results were as follows:

| Catalyst No | 1 | 2 | 3 | 4 | 5 | 6 |
| --- | --- | --- | --- | --- | --- | --- |
| Composition, wt. percent: | | | | | | |
| Al₂O₃ (5% SiO₂) | 0.0 | 20 | 25 | 30 | 50 | 50 |
| Percent Pd on Al₂O₃ | 0.0 | 0.3 | 0.0 | 0.5 | 0.2 | 0.0 |
| 0.5% Pd-zeolite | 100 | 80 | 75 | 70 | 50 | 50 |
| Bulk Density, g./ml | 0.62 | 0.73 | 0.75 | 0.72 | 0.73 | 0.76 |
| Activity, ° F. for 55% conversion | 542 | 541 | 539 | 528 | 559 | 579 |
| Crushing Strength, lbs.: | | | | | | |
| Before calcining | 11.5 | 15.4 | 15.9 | 19.3 | 13.2 | 13.3 |
| After calcining | 21.3 | 35.1 | 32.0 | 33.1 | 27.3 | 27.4 |
| After rehydration and recalcining | ᵃ(9.6) | 16.4 | 20.7 | 20.9 | 17.8 | 16.9 |
| Wt. percent Broken Pellets After Activity Test | 2.3 | | | <0.3 | 0.0 | <0.3 |

ᵃ Estimated on basis of 45% strength retention found for similar catalysts.

The superior mechanical stability of the alumina-containing catalysts is readily apparent. Though the activities on a bulk volume basis are in some cases slightly lower than that of the undiluted catalyst, they are all superior, based on data obtained in other runs, to the activity of the undiluted catalyst when compressed into pellets of 0.7 bulk density.

*Example VII*

To demonstrate the stable activity of the catalysts of this invention in the presence of nitrogen compounds, an extended 40-day hydrocracking run was carried out, using as the initial feed a hydrofined gas oil characterized as follows:

| | |
| --- | --- |
| Boiling range, ° F. | 384–860 |
| Gravity, ° API | 34.7 |
| Sulfur, wt. percent | 0.38 |
| Nitrogen, p.p.m. | 5 |
| Aromatics, vol. percent | 30 |

The catalyst employed was a copelleted mixture of (A) 20 weight-percent alumina impregnated with 0.5% of palladium, and (B) 80 weight-percent of a 0.5% Pd–Y molecular sieve hydrocracking catalyst wherein about 50% of the ion-exchange capacity was satisfied by hydrogen ions, and about 40% by magnesium ions (3.6% by weight MgO). Hydrocracking conditions constant throughout the run were: pressure, 1,500 p.s.i.g., LHCV, 1.5, H₂/oil ratio, 8,000 s.c.f./b. Temperature was adjusted during the run to maintain 60 volume-percent conversion per pass to 400° F. end-point gasoline. The significant results were as follows:

(1) After a four-day induction period, the daily temperature increase required to maintain the 60% conversion remained stable at about 1.8° F. for a period of 21 days, going from 540° to 577° F.

(2) At the end of the 25-day run, the feed was modified by adding thereto 1,700 p.p.m. of nitrogen in the form of tert-butylamine an 17 p.p.m. as quinaldine. An immediate temperature rise from 576° to 720° F. was required in order to maintain conversion, but after 6 days the temperature levelled out at about 735° F., and the temperature increase requirement thereafter was only about 0.1–0.2° F. per day.

Results analogous to those indicated in the foregoing examples are obtained when other hydrogenating promoters described herein are substituted for the palladium used on the Y sieve. It is hence not intended to limit the invention to the details of the examples, but only broadly as defined in the following claims.

I claim:

1. A method for hydrocracking a hydrocarbon feedstock to produce lower boiling hydrocarbons, which comprises subjecting said feedstock to hydrocracking conditions of temperature and pressure including a pressure above about 800 p.s.i.g., in the presence of added hydrogen and a fixed bed of hydrocracking catalyst comprising a copelleted composite and (A) a zeolite catalyst component comprising a minor proportion of a Group VIII metal hydrogenating component and a major proportion of a crystalline zeolitic, alumino-silicate molecular sieve cracking component characterized by a relatively uniform crystal pore diameter between about 6 and 14 A., a SiO₂/Al₂O₃ mole-ratio greater than about 3, and a zeolitic cation content including a substantial proportion of hydrogen ions amounting to at least about 20% of the total ion-exchange capacity thereof, and (B) at least 10% by weight of a powdered adjuvant selected from the class consisting of alumina, magnesia, silica, hydrogen clays and mixtures thereof, the relative proportions of said components (A) and (B) being further adjusted and correlated with the zeolitic hydrogen ion content of said component (A) to provide a finished catalyst having a hydrocracking activity on a bulk-volume basis at least substantially equal to the activity of said component (A) alone when pelleted to the same size and to a bulk density of 0.7 gm./ml.

2. A method as defined in claim 1 wherein said hydrocracking is carried out at a liquid hourly space velocity which is above about 0.7, and is higher than the liquid hourly space velocity required to effect the same conversion under the same hydrocracking conditions using as the catalyst said component (A) alone pelleted to the same size and to a bulk density of 0.7 gm./ml.

3. A method as defined in claim 1 wherein said hydrocracking is carried out at a temperature below about 800° F., and below the temperature required to effect the same conversion with an equal bulk volume of said component (A) alone pelleted to the same size and to a bulk density of 0.7 gm./ml.

4. A method as defined in claim 1 wherein said molecular sieve cracking component is of the Y crystal type.

5. A method as defined in claim 1 wherein said Group VIII metal is palladium.

6. A method as defined in claim 1 wherein said adjuvant is essentially alumina.

7. A method as defined in claim 1 wherein said adjuvant is essentially magnesia.

8. A method as defined in claim 1 wherein said adjuvant contains a minor proportion of a Group VIII metal hydrogenating component.

9. A method for hydrocracking a gas oil feedstock to produce a hydrocarbon product boiling in the gasoline-jet fuel range, which comprises subjecting said feedstock to catalytic hydrocracking at a liquid hourly space velocity above about 0.7, a pressure between about 800 and 3,000 p.s.i.g., and a temperature between about 450° and 850° F., in the presence of added hydrogen and a fixed bed of hydrocracking catalyst comprising a copelleted composite of (A) a zeolite catalyst component comprising a minor proportion of a Group VIII metal hydrogenating component and a major proportion of a crystalline zeolitic, alumino-silicate molecular sieve cracking component characterized by a relatively uniform crystal pore diameter between about 6 and 14 A., a SiO₂/Al₂O₃ mole-ratio greater than about 3, and a zeolitic cation content including a substantial proportion of hydrogen ions amounting to at least about 20% of the total ion-exchange capacity thereof, and (B) at least 10% by weight of a powdered adjuvant selected from the class consisting of alumina, magnesia, silica, hydrogen clays and mixtures thereof, the relative proportions of said components (A) and (B) being further adjusted and correlated with the zeolitic hydrogen ion content of said component (A) to provide a finished catalyst having a hydrocracking activity on a bulk-volume basis at least substantially equal to the activity of said component (A) alone when pelleted to the same size and to a bulk density of 0.7 gm./ml.

10. A method as defined in claim 9 wherein said feedstock contains between about 1 and 2,000 p.p.m. of organic nitrogen.

11. A method as defined in claim 9 wherein said hydrocracking is initiated at a temperature between about 450° and 600° F., and is continued without catalyst regeneration for at least about six months while periodically raising the hydrocracking temperature an average of about 0.01–2° F. per day.

12. A method as defined in claim 9 wherein said molecular sieve cracking base is of the "Y" crystal type, and wherein said hydrogenating component is a Group VIII noble metal incorporated by ion exchange into the crystal lattice of said cracking base.

References Cited by the Examiner
UNITED STATES PATENTS

| | | | |
|---|---|---|---|
| 2,983,670 | 5/1961 | Seubold | 208—111 |
| 3,130,006 | 4/1964 | Rabo et al. | 23—110 |
| 3,140,249 | 7/1964 | Plank et al. | 208—120 |
| 3,140,252 | 7/1964 | Frilette et al. | 208—119 |

DELBERT E. GANTZ, *Primary Examiner.*

ALPHONSO D. SULLIVAN, *Examiner.*

A. RIMENS, *Assistant Examiner.*